(12) United States Patent
Russell

(10) Patent No.: US 7,055,829 B2
(45) Date of Patent: Jun. 6, 2006

(54) ANTIEXTRUSION DEVICE

(76) Inventor: Larry R. Russell, 3607 Gramercy, Houston, TX (US) 77025-1320

( * ) Notice: Subject to any disclaimer, the term of this patent is extended or adjusted under 35 U.S.C. 154(b) by 226 days.

(21) Appl. No.: 09/788,970

(22) Filed: Feb. 19, 2001

(65) Prior Publication Data

US 2001/0045746 A1 Nov. 29, 2001

Related U.S. Application Data

(60) Provisional application No. 60/184,169, filed on Feb. 21, 2000, and provisional application No. 60/184,168, filed on Feb. 21, 2000.

(51) Int. Cl.
*F16J 15/16* (2006.01)

(52) U.S. Cl. .................. 277/585; 277/611; 277/651

(58) Field of Classification Search .............. 277/335, 277/341, 628, 637, 638, 651, 602, 611, 616, 277/618, 585, 383
See application file for complete search history.

(56) References Cited

U.S. PATENT DOCUMENTS

| 707,930 | A | | 8/1902 | Kirschning | |
|---|---|---|---|---|---|
| 926,841 | A | * | 7/1909 | Bartlett | 277/535 |
| 1,735,264 | A | * | 11/1929 | Crickmer | 166/202 |
| 1,976,948 | A | | 10/1934 | Lehon | |
| 2,551,563 | A | | 5/1951 | Jepson | |
| 3,118,682 | A | | 1/1964 | Fredd | |
| 3,150,886 | A | | 9/1964 | Briegel et al. | |
| 3,588,131 | A | | 6/1971 | Nicholson | |
| 3,841,644 | A | * | 10/1974 | White | 277/468 |
| 4,015,818 | A | | 4/1977 | Tawakol | |
| 4,058,084 | A | * | 11/1977 | Kawaguchi et al. | 188/71.8 |
| 4,214,764 | A | * | 7/1980 | Fava | 277/383 |
| 4,305,591 | A | | 12/1981 | de Sivry et al. | |
| 4,379,558 | A | | 4/1983 | Pippert | |
| 4,444,400 | A | * | 4/1984 | Norman | 277/336 |
| 4,728,125 | A | | 3/1988 | Reneau | |
| 4,793,242 | A | * | 12/1988 | Kobayashi | 277/572 |
| 4,795,174 | A | * | 1/1989 | Whitlow | 277/654 |
| 4,892,320 | A | * | 1/1990 | Tuckmantel | 277/535 |
| 5,094,467 | A | * | 3/1992 | Lagabe | 277/616 |
| 5,108,078 | A | | 4/1992 | Balsells | |
| 5,160,122 | A | | 11/1992 | Belsells | |
| 5,163,692 | A | * | 11/1992 | Schofield et al. | 277/436 |
| 5,330,156 | A | | 7/1994 | McKavanagh | |
| 5,437,489 | A | | 8/1995 | Sanders et al. | |
| 5,639,103 | A | * | 6/1997 | Jeanne et al. | 277/596 |
| 5,791,653 | A | * | 8/1998 | Canani | 277/500 |
| 6,092,811 | A | * | 7/2000 | Bojarczuk et al. | 277/627 |
| 6,435,597 | B1 | * | 8/2002 | Anders et al. | 296/107.07 |
| 6,651,988 | B1 | * | 11/2003 | Terpay et al. | 277/560 |

OTHER PUBLICATIONS

*Parker O–Ring Handbook*, Parker Seal Group, O–Ring Division, Parker Corporation, Mar. 1982.

(Continued)

*Primary Examiner*—Alison K. Pickard
(74) *Attorney, Agent, or Firm*—Elizabeth R. Hall

(57) ABSTRACT

An elastomeric seal having an antiextrusion device molded integrally into or onto the low pressure side of the seal. The antiextrusion of a corrugated strip into an elastomeric seal. One embodiment of the invention has the strip positioned with the midplane of its corrugations normal to the mating seal surfaces and parallel to the midplane of the seal groove. Another embodiment of the invention has the midplane of the corrugations canted within the seal. The antiextrusion device is applicable to annular seal rings, linear seals, or seals of more complex configuration.

3 Claims, 5 Drawing Sheets

OTHER PUBLICATIONS

"Getting to Know O–Rings", *Machine Design*, Nov. 18, 1999, pp. 102–104.
"Packer Elements & V–Ring Sealing Sets"; Sales Flyer, Metex/OEM Components Inc., Houston, Texas.
"G–T Rings", Catalog, Greene, Tweed & Co., North Wales, Pennsylvania, 1974.
"Hallite Catalog", Halite Seals, Inc., Fort Wayne, Indiana.
*Piping Repair & Maintenance Products*, Catalog, Plidco International, Inc., Cleveland, Ohio, 1992.
"Pipeline Repair Products: Pipeline Repair Clamp", Catalog Section, Hydrotech Systems, Inc., Houston, Texas, 1995.
"The Smart Pipeline Repair System", Brochure, Oceaneering Pipeline Repair Systems, Houston, Texas, 1992.
"John Crane Pressure–Wiper Seal Type RH/BWC", Sales Flyer, John Crane Packing Company, Morton Grove, Illinois.
"Precision Edgewound Seal Ring Products", Smalley Seal Division, Wheeling, Illinois, 1990.
"Laminar Sealing Rings", Smalley Steel Ring Company, Wheeling, Illinois, 1995.
*Variseal Design Guide*, p. 1–3, American Variseal, Broomfield, Colorado, 1994.
"Axial Shaft Seals", Sales Brochure, Hirschmann GmbH, Flourn–Winzeln, Germany.
*Parker Metal Gaskets and Seals*, Parker Hannifin Corp. Gasket Division, Sulphur, Louisiana, 1986.
Catalog, Metallo Gasket Co., New Brunswick, New Jersey.
"Halogen Virgin TFE U–Cups", p. 8, Sales Brochure, Halogen Insulator and Seal Corp, Elk Grove, Illinois.
"Seals", Sales Brochure, Hydrodyne Division of F.P.I., Inc., North Hollywood, California, 1972.
"Turcite Fluid Power Seals", Sales Brochure, W.S. Shamban & Company, Los Angeles, California.
"J.A.R. Seal", Sales Brochure, Microdot/Polyseal Division, Salt Lake City, Utah.

* cited by examiner

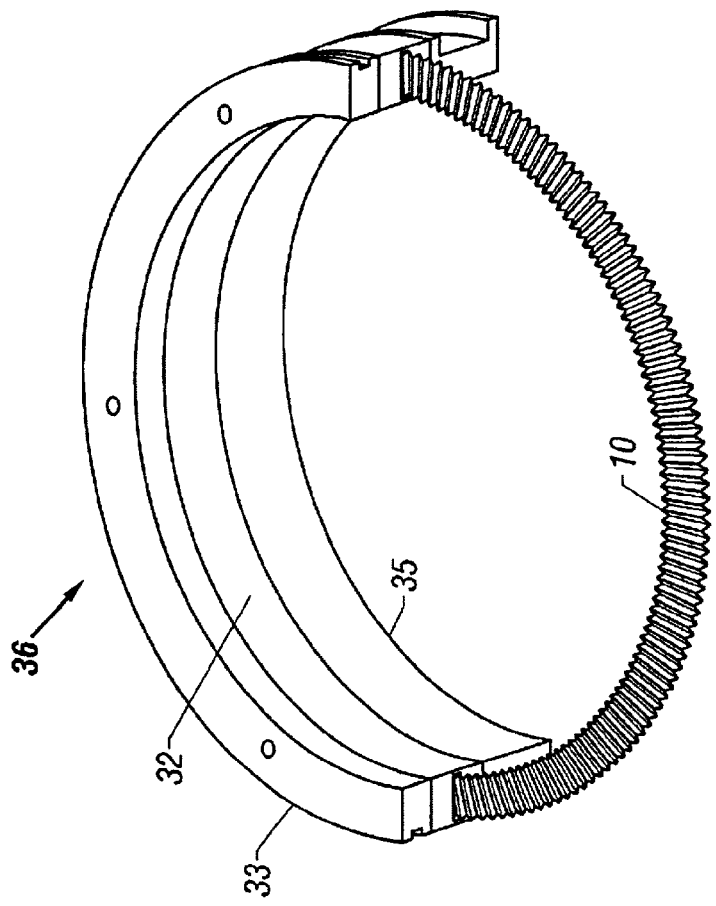
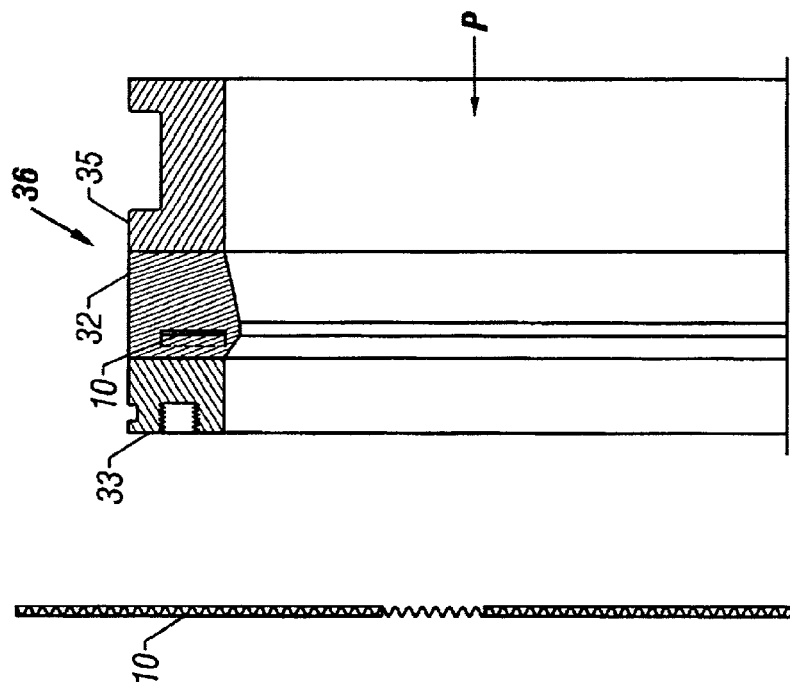

ANTIEXTRUSION DEVICE

CROSS-REFERENCE TO RELATED APPLICATION

The present application, pursuant to 35 U.S.C. 111 (b), claims the benefit of the earlier filing date of Provisional Application Ser. No. 60/184,168 filed Feb. 21, 2000, and entitled "Improvements to Antiextrusion Means for Seals." The present invention is also related to another Provisional patent application Ser. No. 60/184,169 also filed Feb. 21, 2000 entitled "Novel Method and Apparatus for Sealing."

BRIEF DESCRIPTION OF THE INVENTION

The present invention relates in general to elastomeric seals having an antiextrusion device molded integrally into or onto the low pressure side of the seals. More particularly, the invention relates to the integration of a corrugated strip into an elastomeric seal. One embodiment of the invention has the strip positioned with the midplane of its corrugations normal to the mating seal surfaces and parallel to the midplane of the seal groove. Another embodiment of the invention has the midplane of the corrugations canted within the seal. The antiextrusion device is applicable to annular seal rings, linear seals, or seals of more complex configuration.

BACKGROUND OF THE INVENTION

Elastomeric seals are in very common use in a wide variety of applications as a means for closing off a flow passageway (gap) between two parts. The parts are usually metallic and will, unless measures are taken, allow fluids to pass through the gap where the two pieces are joined. To prevent the escape or loss of fluid at these gaps, flexible elastomeric seals are typically used to close the gap between the two parts. To achieve this function, the elastomeric seal is placed in a cavity or groove in a first part and the exposed side of the seal is comated with the surface of a second part. The prevention of fluid passage through a gap between such parts generally relies upon the maintenance of an initial interference fit of the seal with attendant interface biasing forces between the sealing element and the two parts.

Previously this initial interference fit, which is termed 'presqueeze' and refers to the condition prior to the application of fluid pressure, has been obtained either: a) passively from displacement-induced forces due to the size and protrusion of the elastomeric seal when mounted in the groove, or b) actively by compressing the elastomeric seal after it is mounted in the groove. Sanders et al. U.S. Pat. No. 5,437,489 shows examples of passively presqueezed seals, while Reneau U.S. Pat. No. 4,728,125 discusses an example of an actively presqueezed seal.

As fluid pressure is applied to one side of the elastomeric seal, the seal will deform and shift in the direction of the fluid pressure forces. With time under high pressure loads and/or as the pressure increases, the seal will continue to displace toward the low pressure side of the groove and become further distorted and "cold flow" or "creep" into the gap. This time-dependent behavior is further enhanced if the elastomeric seal shrinks in volume or is softened by heat or its interaction with retained fluids. This problem is intensified when the elastomeric material begins to shear off into the gap to be sealed. In some cases the entire seal is displaced into the gap. Shearing and tearing of the elastomeric material from the extrusion of the seal into the gap can cause the seal to fail. These problems are significantly amplified as the size of the gap to be sealed is increased.

The industry has implemented a number of improvements in seals to help solve the problems of creep and extrusion, which lead to seal failure. Such improvements have enhanced elastomeric seal performance, but none of the improvements have fully solved the problem of creep and extrusion, particularly for large gaps and for high pressure situations.

A frequent improvement used for large gap or high-pressure situations has been to provide an antiextrusion device on the low-pressure side of the seal. This approach can minimize static and creep deflections of the seal into the seal gap. The typical antiextrusion device is made of a stiffer, stronger material than the seal elastomer. The antiextrusion device is either integrally bonded to the external surface of the seal or retained in the seal groove as a separate item. Either way, the antiextrusion device is generally positioned on the downstream face of the seal to protrude into the gap and back up the seal. Antiextrusion devices assist in reducing sensitivity of the elastomer seal to creep, thereby aiding in the maintenance of the initial interference fit.

The antiextrusion device ideally should provide low resistance to distortion (i.e., low stiffness) across the seal gap to permit large deflections of the device in that direction without the device undergoing permanent deformation. Concurrently, the antiextrusion device must provide both high stiffness and high strength to resist bending and shear distortion of the seal element into the gap. Sealing the gap and resisting creep of the seal into the gap requires some embedment or entrapment of the antiextrusion device in the seal to permit the seal to react against the low-pressure end wall of the seal groove to provide resistive forces to pressure loading. These requirements are very difficult to satisfy for linear, annular or circumferential seals for large gaps, because provision of adequate stiffness and strength for resisting movement into the gap generally requires that the antiextrusion device (ring) be provided with a geometry which causes the ring to have undesirably high resistance to distortion across the gap. Generally, only a very limited gap size can be spanned by currently used antiextrusion devices without permanent distortion of the devices.

Two types of non-integral, metallic antiextrusion devices are used for large gaps for both linear and annular seals. One type uses non-integral, bendable metallic fingers on the downstream side of the seal. These fingers have a common base strip which serves as anchor, while each finger functions independently. In certain antiextrusion rings of this type, the individual metallic fingers undergo excess bending and are not reliable for multiple sealings. In fact, they have been known to evert due to inadequate bending strength or excessive gap in severe cases. The second type of non-integral, metallic antiextrusion rings are knitted metal annular antiextrusion rings (Metex, Edison, N.J.). These knitted metal rings are suitable for relatively large gaps and are used for oilfield downhole packers. However, these knitted antiextrusion rings have very little elastic rebound, so that resetting of the seal is not advisable or necessarily feasible due to inability to fully retract.

The use of antiextrusion rings made of more flexible materials, such as a stiff elastomer or plastic material, for large circumferential seal gaps requires that the size of the antiextrusion ring and seal be significantly increased in order to provide sufficient embedment of the antiextrusion ring to resist creep, bending, and shearing of the rings. For active mechanically compressed seals, such as in Reneau U.S. Pat. No. 4,728,125 or the Oceaneering "Smart Flange Plus"™ (Oceaneering International, Inc., Houston, Tex.), the larger rings and seals require larger seal compression hardware and a significantly larger and much more expensive housing. Again, provision of satisfactory resistance to bending distortion in the seal gap will impede the ability of the antiextrusion ring to adequately distort to span a large gap. Stiffer ring materials have improved creep and stiffness performance, but are less conformable to large gaps and generally will permanently distort when spanning larger gaps. Less stiff ring materials require even larger seal cavities to adequately embed them.

The significant areas of performance difficulty cited for large gaps and high pressures with conventional seals frequently lead to leaks or complete seal failures. For critical service conditions, such as deep water subsea pipeline repair clamps or hot-tap pipeline fittings, revisiting the clamp for adjusting the compressional preload on installed seals is prohibitively expensive. Further, providing more compressional preload in such cases is not practical for passive seals for reasons of installation damage to the seal due to excessive interference and an increased tendency of the seal to creep and extrude through the gap with high preloads.

Thus, a need exists for seals that can perform in large gap and high pressure situations.

SUMMARY OF THE INVENTION

The invention contemplates a simple, inexpensive device for solving the problems and disadvantages of the prior approaches discussed above. The present invention provides a simple, reliable means for avoiding seal extrusion for large gaps and high pressures.

One aspect of the present invention is an antiextrusion device made of a rigid corrugated material substantially in a circular planar arrangement.

A second aspect of the present invention is an antiextrusion device made of a rigid corrugated material substantially in a right frustroconical pattern.

A third aspect of the present invention is an antiextrusion device made of a rigid corrugated material in a linear strip.

A fourth aspect of the present invention is an antiextrusion device made of a rigid corrugated material and positioned within a seal at a fixed distance from the low pressure lateral face of the seal.

In accordance with another aspect of the invention, an elastomeric seal is described having one or more antiextrusion devices made of a rigid corrugated material embedded in and bonded to the elastomeric material in the seal.

In accordance with yet another aspect of the invention, a sealing unit is described that has an elastomeric seal containing an embedded antiextrusion device, a static seal end and a movable seal end. The movable seal end can be moved from its original position to stretch the elastomeric seal and displace the antiextrusion device. The movable seal tension can then be released to permit the seal and the embedded antiextrusion device to attemp to return to their original positions.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

The novel features which are believed to be characteristic of the invention, both as to its structure and methods of operation, together with the objects and advantages thereof, will be better understood from the following description taken in conjunction with the accompanying drawings, wherein:

FIG. 2 shows a side view of the embodiment of the corrugated antiextrusion device of FIG. IA;

FIG. 3A illustrates a quarter-sectional view of the first embodiment, shown in FIGS. 1A and 2, of an antiextrusion device embedded in an annular seal assembly unit;

FIG. 3B illustrates a perspective view of the annular seal assembly shown in FIG. 3A partially cut away to show a corrugated antiextrusion device embedded in the seal;

DETAILED DESCRIPTION OF THE INVENTION

Figure 1A:
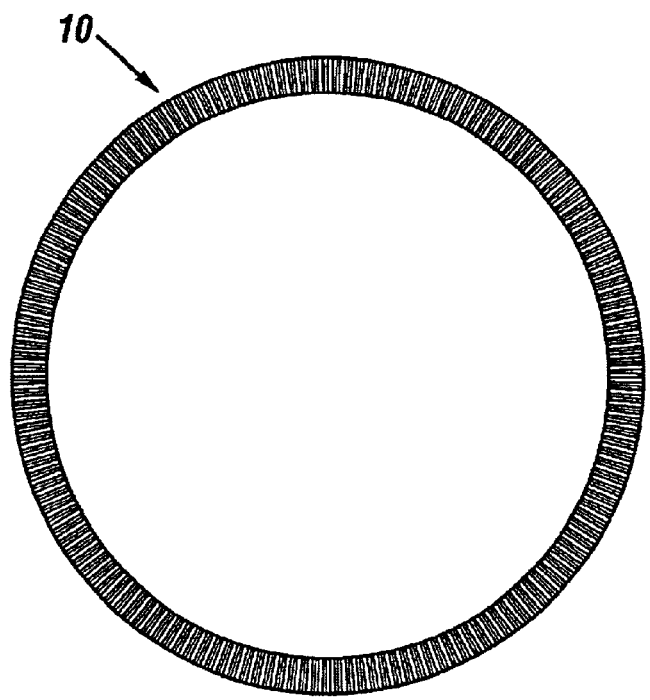
FIG. 1A shows a frontal view of a first embodiment of an annular corrugated antiextrusion device.

The present invention provides elastomeric seals having an antiextrusion device molded integrally into the low pressure side of the seals. By strengthening the low pressure side of the elastomeric seal, it becomes resistant to both any initial displacement into the seal gap and any time-dependent continued deformation through the seal gap resulting from "creep."

The present invention integrates an antiextrusion limiting means with seals to assist in the control of relative displacements into the seal gap and to provide reversible, repeatable displacements across the seal gap under varying pressures and gaps. Various antiextrusion ring designs were studied for their suitability to be integrally molded into an elastomeric seal. Most of the available antiextrusion ring designs are not suitable for integral molding into an elastomeric seal, and even if they were incorporated into seals they would not provide both the low resistance to distortion across the seal gap (necessary for stability in large gaps) and the necessary stiffness and high strength to resist extrusion and creep into the gap under high pressure.

For example, Crane Packing Company, Morton Grove, Ill. has bonded an elastomer to a metal reinforcing washer. The metal washer serves as an internal antiextrusion ring, but the radial inflexibility of the washer causes the ring to be unsatisfactory for large gaps.

Conventional metal piston rings and laminar sealing rings exhibit a high ratio of radial wall thickness to thickness in the axial direction to enhance the support provided by the seal cavity and the stiffness of the rings. However, the attendant high resistance to change of the ring diameter makes metal piston rings and laminar rings unable to readily conform to large gaps. Using split rings results in shear of the elastomer adjacent the split.

Three types of U-cup seal expander springs are marketed by American Variseal, Broomfield, Colo. These U-cup seal expander springs provide low circumferential stiffness to permit conformance to large annular gaps. However, the slanted helical spring and the flat-wire helical coil spring would be difficult to mold into an elastomeric seal and offer both very low torsional stiffness and low bending and shear strength. Additionally, the bonding surface for the slanted helical spring is very limited. The third type has an alternating radially-oriented cantilever spring. This spring would be easy to mold into a seal with the cantilever beam axes in either a planar or conical configuration. Hirschmann Gmbh (Hirschmann Engineering, Chandler, Ariz.) also uses this same type of relatively weak alternating cantilever spring in a non-integral planar configuration retained by detent grooves in an elastomer as a low-pressure axial shaft seal. However, this type of ring has insufficient beam strength and stiffness to elastically resist distortion of the seal into a large gap under high pressure.

Corrugated metal-to-metal seals with the midplane of the coplanar circumferential corrugation waves parallel, rather than normal, to the faces to be sealed have been used for annular flange face seals (Parker Hannifin Corporation, Sulphur, La. and Metallo Gasket Company, New Brunswick, N.J.). The corrugations are multiple concentric annular ridges of different diameters. The crests of the corrugation waves bear on the surfaces of the flanges to provide multiple annular seal lines. Use of the corrugations provides multiple possible sealing lines and adds very low level flexibility to deal with flange gap irregularities and disturbances. However, this situation is not similar to the spanning of a large circumferential or linear gap.

Mildly corrugated wave springs for axially preloading a wedge expander to spread and engage the sealing lips of a circular U-cup type of seal with its comating sealing surfaces has also been used. For this case, the midplane of the corrugation waves is normal to the cylindrical sealing faces, but the wave spring is used only for force application and does not provide a backup function.

Hydrodyne, a division of F.P.I., Hollywood, Calif. produces corrugated metallic seals as flange face seals with a cylindrical midsurface normal to the flat comating sealing faces. These seals provide only a minor flexibility to the seals to compensate for irregularities and variations in the seal gap. Other Hydrodyne metallic seals are not actually corrugated, but use the central rib to stiffen the U-shaped cross-section of the ring against axial deflection. None of these seals are suitable as antiextrusion devices.

Corrugated Marcel wave spring expanders have been used to radially expand a relatively rigid split plastic piston ring. However, the midsurface of the corrugation waves is cylindrical and parallel to the cylindrical seal mating faces. Although these expanders provide a radial force on the ring, they are not suitable for antiextrusion service.

Microdot/Polyseal of Salt Lake City, Utah makes a seal having a corrugated four-piece construction which mounts in a standard groove for an O-ring with two O-ring backup rings. The relatively rigid seal ring itself is continuous with an essentially corrugated pattern and has a rectangular cross-section relatively small compared to the overall seal groove. The midsurface of the corrugations is planar and transverse to the comating cylindrical sealing surfaces. The abutment rings are also relatively rigid and are split, with one transverse face planar and the other face corrugated to closely mate with the seal ring. An elastomeric expander ring is used underneath both the seal ring and the abutment rings to preload the relatively rigid seal onto the sealed surface. This arrangement permits easy assembly of the substantially unstretchable seal into its groove, since its diameter is effectively increased whenever the corrugations are straightened under assembly tension (for male seals) or compression (for female seals). The seal is sufficiently rigid to not require antiextrusion rings, so the abutment rings function not as antiextrusion devices, but rather serve only to maintain the corrugated geometry of the installed seal ring necessary to take up the excess seal length provided to permit assembly. The abutment rings and the sealing element in this case are unsuitable for handling large gaps, since increasing the cross-sectional sizes of the elements to handle large gaps and high pressures makes this seal system very large and much harder to assemble.

The present invention uses a unique corrugated metallic seal molded into an elastomeric material that provides both the low resistance to distortion-across the seal gap (necessary for seal stability in large gaps) and the necessary stiffness and high strength to resist creep and extrusion into the gap under high pressure.

Referring now to the drawings, and initially to FIGS. 1A and 2, it is pointed out that like reference characters designate like or similar parts throughout the drawings. The figures, or drawings, are not intended to be to scale. For example, purely for the sake of greater clarity in the drawings, wall thickness and spacing are not dimensioned as they actually exist in the embodiment.

A first embodiment of the present invention suitable for application in either a female or male circumferential seal is shown in FIGS. 1A and 2. FIG. 1A shows a view in the axial direction of a substantially planar annular antiextrusion ring prior to molding, while FIG. 2 shows a radial side view.

In FIGS. 1A and 2, the antiextrusion device 10 of this embodiment is preferably constructed of a relatively thin metallic strip material such as carbon or stainless steel. For example, a corrugated metal strip that is formed in a generally circular pattern and is approximately 0.016 to 0.031 inch thick would be suitable for a 12-inch pipeline clamp at a maximum operating pressure of 3000 psi. The ratio of radial annular thickness of the corrugated material of the antiextrusion device 10 to the wave height of the corrugations (axial thickness) is on the order of 3 to 20, largely depending on the pressure capabilities required.

The midplane of the corrugations is normal to the axis of the ring. The corrugations may be formed by rolling, pressing, or other similar means so that they are uniform. It is desirable to form the corrugations in a pattern such as the ring that will be approximately stress-free at the diameter at which it will be molded and used. The freedom from large locked-in stresses will ensure that the ring will remain substantially planar during molding, rather than becoming conical or otherwise distorting as a consequence of buckling.

Figure 1B:
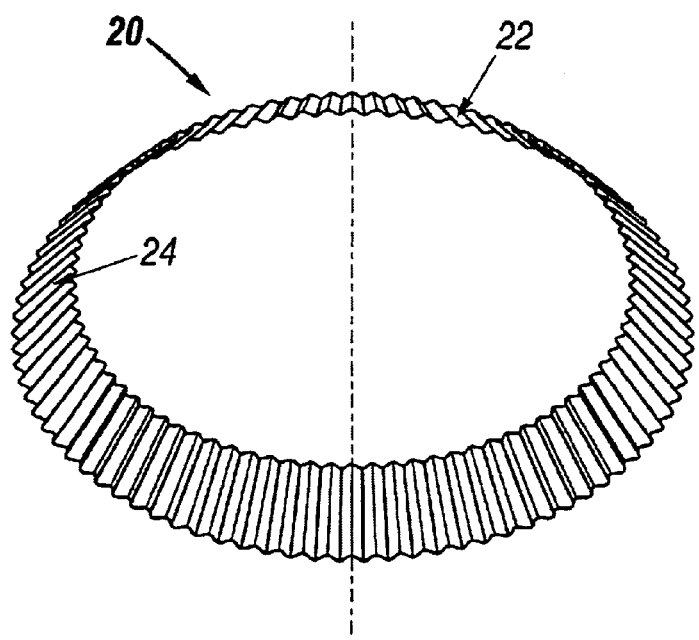
FIG. 1B shows a perspective view of a second embodiment of a right frusto-conical corrugated antiextrusion device.

FIG. 1B illustrates another embodiment of an antiextrusion device 20. Antiextrusion device 20, like the antiextrusion device 10 of FIG. 1A, is constructed of a corrugated rigid material, such as a thin metallic strip. The planar ring of FIG. 1A is a degenerate of the conical ring (i.e., having a 90° angle between the cone axis and the generating ray of the cone. The antiextrusion device 20 is formed in substantially a right frusto-conical ring pattern having an outer conical side 22 and an inner conical side 24, where the angle between the axis of the cone and its sides is typically 45° to 90°. Antiextrusion devices having right frusto-conical ring patterns provide the desirable reduced seal circumferential stiffness and can offer comparatively reduced elastomer-to-ring bond stress. Although conical antiextrusion devices are somewhat more complex to mold than planar ones, the use of conical ring patterns is not otherwise precluded.

The corrugations provide significant increases in bending stiffness normal to the midplane of the corrugations when compared to the stiffness of a flat strip of the source material. Simultaneously the corrugations markedly decrease the circumferential stiffness of the ring, so that resistance to changes in the diameter of the overall antiextrusion device 10 are significantly smaller when compared to an uncorrugated ring with the same material thickness.

FIG. 3A shows an annular elastomeric sealing unit 36 in which the annular seal 32 is bonded to a first and second metallic end rings 33 and 35. This sealing unit is further described in co-pending patent application entitled "Seal Unit and Its Installation." FIG. 3B is a perspective view of the sealing unit 36 where the elastomeric seal 32 and end rings 33 and 35 have been partially cut away to show the placement of the antiextrusion device 10 within the seal. The antiextrusion device 10 is totally embedded in and bonded to the elastomeric seal 32.

Figure 4A:
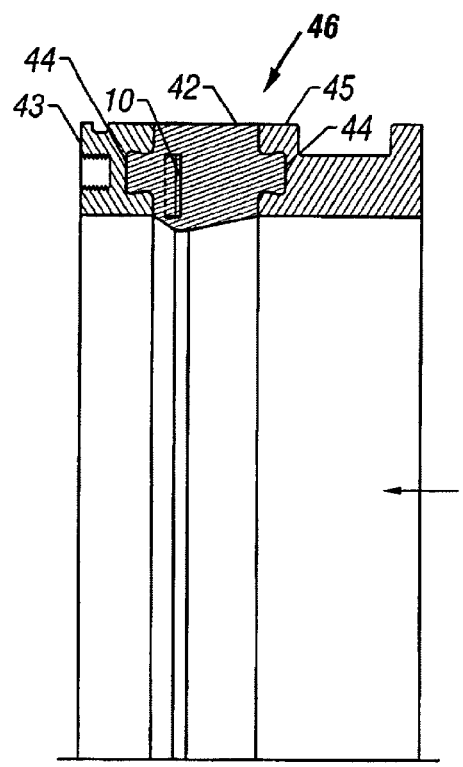
FIG. 4A illustrates a quarter-sectional view of the first embodiment of the antiextrusion device embedded in another annular seal in which the midplane of the corrugations of the antiextrusion device is normal to the comating sealing surface of the seal.

FIG. 4A shows another embodiment of an annular elastomeric sealing unit 46 in which the annular seal 42 is bonded to first and second metallic end rings 43 and 45. The antiextrusion device 10 is integrally molded into and bonded to an elastomeric seal 42 suitable for use with the large gaps commonly found in pipeline repair clamps. One or more antiextrusion devices 10 can be molded into the elastomeric matrix of a seal 42 on the low pressure side of the seal, as shown in detail to the left, low pressure side of seal 42 in FIG. 4A.

Figure 4B:
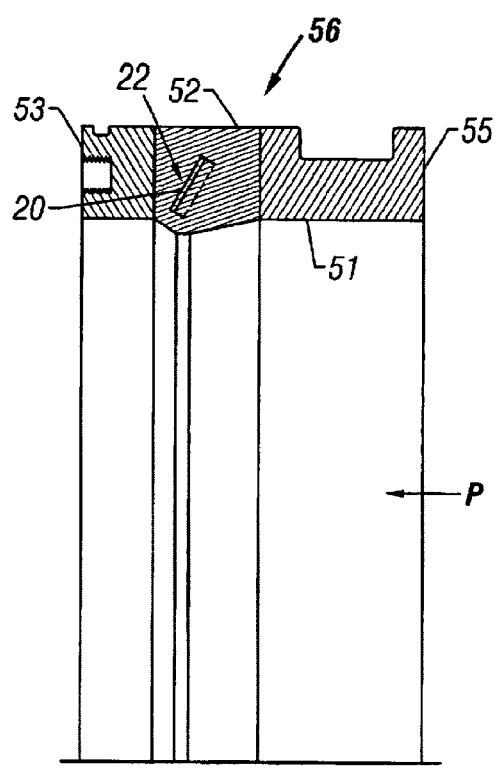
FIG. 4B illustrates a quarter-sectional view of an antiextrusion device of FIG. 1B embedded in an annular seal in which the midplane of the corrugations of the antiextrusion device is at an angle of 45° to 135° to the stretched comating surface of the seal.

FIG. 4B shows a similar annular elastomeric sealing unit 56 in which the circumferential seal 52 is bonded to first and second metallic end rings 53 and 55. The corrugated conical antiextrusion device 20 is integrally molded into and bonded to an elastomeric seal 52 with its conical axis substantially concentric with the axis of the annular seal 52. The corrugated wave crests run parallel to the conical generating rays, with the wave pattern of the corrugations being uniform and regular. Typical wave profile patterns would be either substantially sinusoidal, rectangular, or trapezoidal.

Figure 4C:
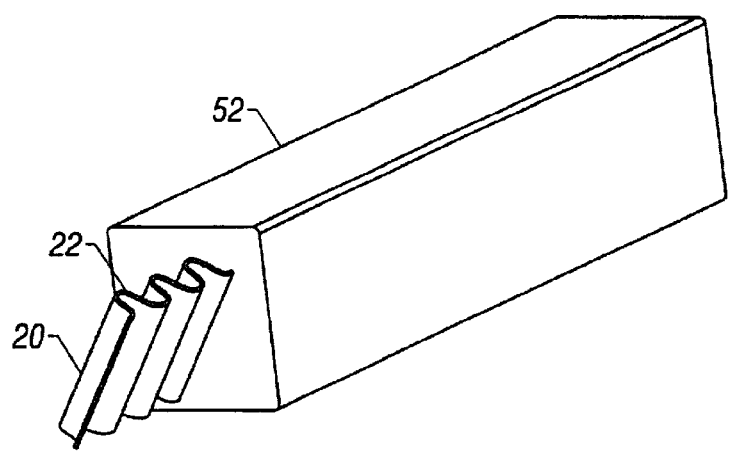
FIG. 4C illustrates a perspective view of the seal element shown in FIG. 4B where the seal has been partially cut away to show the placement of the antiextrusion device shown in FIG. 1B embedded in the seal.

The antiextrusion device 20 of FIG. 4B is embedded such that the midplane of the corrugations of the device 20 is at an angle of 45° to 135° to the bore surface 51 and axis of the second end ring 55. One or more antiextrusion devices 20 can be molded into the elastomeric matrix of the seal 52 on the low pressure side of the seal as shown in FIG. 4B. FIG. 4C shows a perspective view of the antiextrusion device 20 embedded in the seal 52 where the elastomeric seal 52 has been partially cut away to show the placement of the antiextrusion device 20 within the seal. The outer conical side 22 of the device 20 is directed toward the low pressure side of the seal 52.

The particular configuration of the seals shown in FIGS. 3A, 4A and 4B is a novel unidirectional type which is axially tensioned during installation and then relaxed to seal against a cylindrical surface. The type of seal shown in FIGS. 3A, 4A and 4B works in a female annular recess and seals against a male plug. The elastomeric seal elements 42 and 52 are bonded to static seal ends 43 and 53 on their low pressure sides and to first and second movable seal ends 45 and 55 on their high pressure sides to form sealing units 46 and 56 respectively. To assist in maintaining a good connection between the elastomer of seals 42 and 52 and static seal ends 43 and 53 and movable seal ends 45 and 55, undercut face grooves 44 and 54 with rounded edges are provided in on the inside traverse faces of ends 43 and 53 and 45 and 55.

The inner diameter of the antiextrusion device or antiextrusion ring 10 is recessed slightly from the inner diameter of the elastomeric seal 42 so that it is covered on all sides and bonded to the elastomeric matrix. This provision of coverage of the antiextrusion device 10 by elastomer protects both the material of the antiextrusion element and the elastomer-to-antiextrusion element bond from attack by the fluids to be sealed, while also protecting any comating seal surface from contact damage from the antiextrusion element.

One or more of the antiextrusion rings 10 can be molded into elastomeric seal 42 with separations in the axial direction of approximately twice the corrugation wave height or more to further enhance extrusion resistance. Also, one or more antiextrusion rings 10 can be used on both sides of a bi-directional seal so that antiextrusion resistance is available for both pressure directions. Radial distortions of the elastomer of the seal element 42 are not strongly resisted by the antiextrusion ring 10, so the seal unit 42 is readily conformable to varying diameters, imperfections, and ovalities of a comating pipe or mandrel. Yet because the antiextrusion ring 10 is essentially anchored into the matrix of the elastomer at its outer diameter, the antiextrusion ring 10 strongly resists bending out of its plane and extrusion of the relatively unsupported portion of the elastomeric seal spanning the seal gap is strongly resisted by the beam strength of the embedded antiextrusion ring.

The wave crests of the corrugations runs radially for a planar annular antiextrusion device 10. The wave profile of the corrugations of antiextrusion ring 10 at a given radius may be sinusoidal or flat folded plate segments or another suitable, repetitive profile; the ring wave height may be made greater for the smaller radius portion of the ring to facilitate the fabrication of the ring from straight flat strip material. The wave profile shown in FIGS. 1 and 2 is composed of flat segments with radiused intersections for reductions of stress risers at the corners. This type of corrugation has been commonly used in steel fabrication to increase both bending stiffness and bonding strength in steel sheets. For the antiextrusion ring 10, the strength and stiffness are much enhanced over that of flat material for bending about a tangential local axis normal to the wave crests.

Simultaneously, the compressive stiffness of the corrugations in the circumferential direction is much reduced from flat material. Since the resistance of the ring to diameter change is directly controlled by this circumferential stiffness, the corrugated ring 10 may be changed appreciably in diameter without significant resistive forces. Further, the diameter of corrugated ring 10 may be changed over a much larger range without experiencing permanent deformations than would be the case for planar, non-corrugated material. Diameter changes of antiextrusion ring 10 are accommodated by relatively low stress bending and twisting of the corrugations.

In FIG. 4A, an annular female sealing unit 46 is molded with one or more of the antiextrusion rings 10 molded integrally within the elastomeric seal 42 in an axially-spaced array on the low pressure side of the seal. The elastomeric seal 42 will be distorted somewhat from its unstressed, molded condition when released from its tensioned installation condition to assume its presqueezed but unpressurized position against the surface of a pipe. Further distortion from pressure biasing and retained pressure will occur as pressure against the seal increases above its zero initial value during installation.

The outer diameter region of embedded antiextrusion rings 10 is well anchored in the elastomer matrix in a region where there is not much distortion of the elastomer. Thus, although the elastomer will tend to distort into the gap to be sealed, the level of axial distortion of the elastomer adjacent the pipe will be strongly limited by the radial beam strength and stiffness of the corrugated disks of the integral antiextrusion rings 10. The radial movement of the elastomer is not strongly resisted by the antiextrusion rings 10, so that the rings will move with minimal resistance radially inwardly to minimize the unsupported portion of the elastomer in the extrusion gap.

The bond of the elastomer of seal 42 to well anchored antiextrusion ring 10 aids in preventing excessive distortion of the elastomer into the seal gap on the low pressure side. Both the stability and relatively low stress levels of the elastomer matrix around the outer diameter end of antiextrusion ring 10 and the beam strength and stiffness of ring 10 help to maintain the inner diameter region of the ring in a stable position, thereby providing substantial support to the elastomer adjacent the seal gap and minimizing distortion and creep tendencies of the elastomer in that region. In the event of elastomer volume change due to interaction with the fluids around the seal 42 or thermal expansion effects, ring 10 is able to flex to accommodate the elastomer distortions without overstressing while still providing substantial support to the elastomer adjacent the seal gap.

Figure 5:
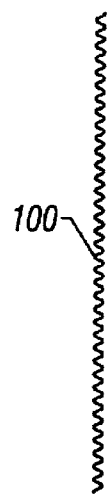
FIG. 5 shows a view of a linear embodiment of the antiextrusion device along the midplane of corrugations transverse to the wave pattern.
Figure 6:
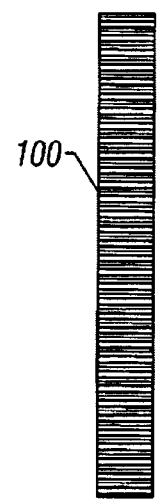
FIG. 6 shows a view of the antiextrusion device of FIG. 5 normal to the midplane of the corrugations.

FIGS. 5 and 6 show a second embodiment of this invention suitable for use with linear seals, such as those shown as longitudinal seals in the split pipeline repair clamp of Sanders, et al. U.S. Pat. No. 5,437,489. FIG. 5 shows a view along the midplane of a corrugated antiextrusion strip 100, while FIG. 6 shows a view of the same strip 100 normal to the midplane of the corrugation waves. The corrugations of rigid antiextrusion strip 100 are regular in profile and are formed by rolling or pressing or other suitable means.

Figure 7A:
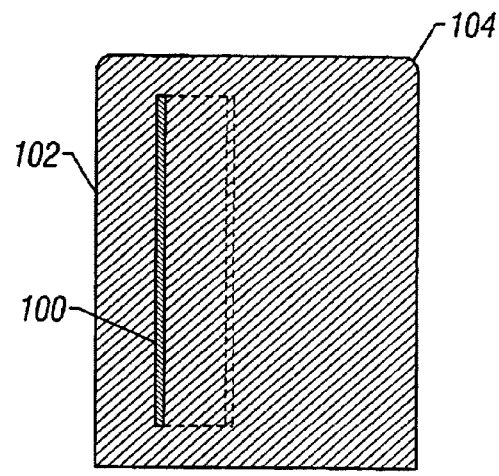
FIG. 7A shows a linear embodiment of a seal with the antiextrusion device of FIGS. 5 and 6 embedded in the seal wherein the midplane of the corrugations of the antiextrusion device is normal to the comating sealing surface of the seal.
Figure 7B:
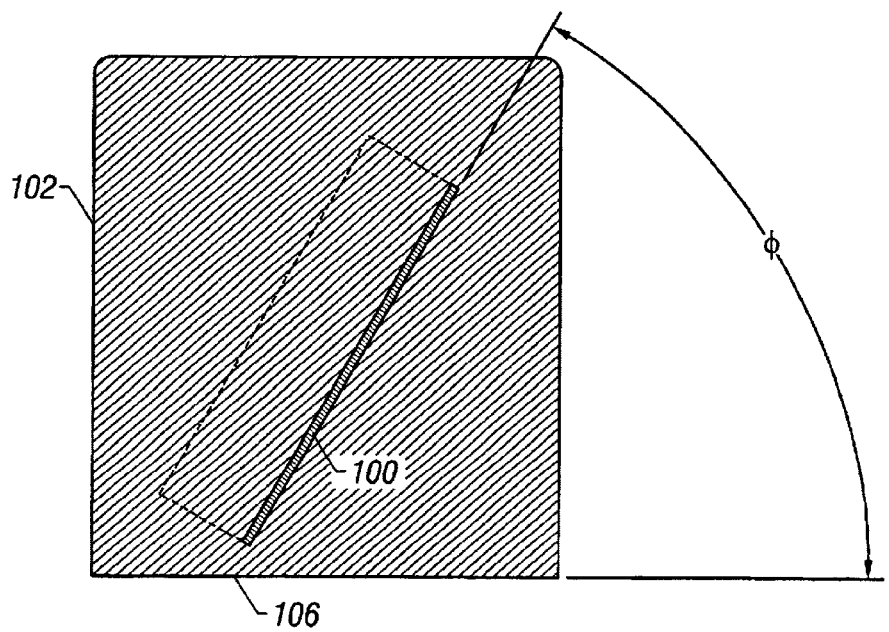
FIG. 7B shows a linear embodiment of a seal with the antiextrusion device of FIGS. 5 and 6 embedded in the seal wherein the midplane of the corrugations of the antiextrusion device is at an angle of 45° to 135° to the comating sealing surface of the seal.

FIGS. 7A and 7B show the antiextrusion strip 100 of FIGS. 5 and 6 molded into the matrix of a passive linear elastomeric seal 102. The term 'passive' indicates that the seal 102 has no means provided for adjusting its presqueeze other than bringing the seal closer to or farther from the surface against which it will seal. The cross-section of linear elastomeric seal 102 is basically rectangular with the two corners 104 which will be inserted into a seal groove typically radiused. The other two corners may also be radiused. The length of the elastomeric seal 102 is slightly more than that of antiextrusion strip 100 to ensure full embedment.

Antiextrusion strip 100 is covered on all sides by elastomer for corrosion protection and to minimize any possible deterioration of the bond between the elastomer and the strip. Antiextrusion strip 100 is positioned closer to the low-pressure side of elastomeric seal 102 than it is to the high-pressure side. Proportions may vary somewhat, depending on the stiffness of the elastomer, maximum pressure, expected seal gap range, and the like. Typically the ratio of the height normal to the comating surface to the width parallel to the comating surface of the seal 102 will range from about 0.2 to about 2.0. The width of the antiextrusion device will range from about 0.75 to about 0.90 times the height of the seal 102. Approximate proportions for a typical seal vary. For example, the width of a seal may be approximately 1 inch and the height of the seal about 1.25 inches with an embedded corrugated strip being about 1 inch wide and about 0.024 inch thick with corrugations 0.25 inch from peak-to-peak with a wavelength of 0.5 inch. The strip would be covered with a minimum of approximately 0.063 inch to 0.188 inch of elastomer.

In FIG. 7A, the antiextrusion strip 100 is embedded such that the midplane of the corrugations of strip 100 is normal to the comating surface 106 of the seal 102. In FIG. 7B, the antiextrusion strip 100 is embedded such that the strip 100 is canted to reduce the bond stress under presqueeze and pressure between the elastomeric matrix of the seal 102 and the antiextrusion strip 100. The antiextrusion strip 100 is embedded in the elastomeric matrix so that the midplane of the corrugations of strip 100 is at an angle Ø to the comating surface 106 of seal 102. Angle Ø preferably ranges between 45 degrees and 135 degrees.

Figure 8:
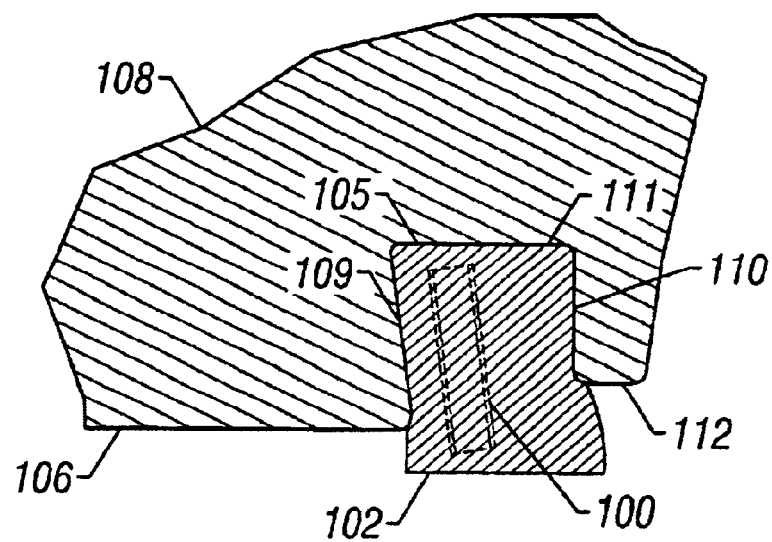
FIG. 8 shows the seal of FIG. 7A installed in a linear seal groove.

FIG. 8 shows the linear elastomeric seal 102 of FIG. 7 positioned into a seal groove 105 such as would be used in the longitudinal seal groove of a split pipeline repair clamp. The groove 105 is provided in face 106 of the carrier body 108, with its throat narrower than the seal width to provide a close fit between seal 102 and the inner portion of the groove 105 so that seal retention is ensured. The depth of groove 105 is less than the height of the cross-section of seal 102 so that sufficient seal protrusion will exist in order to ensure adequate presqueeze, even with large seal gaps. The low pressure side 109 of groove 105 is inclined towards the high pressure side 110 at its outer end, while the inner groove side 111 is parallel to the face 106 and the surface against which the seal will be presqueezed. The high pressure side 110 of groove 105 is normal to the face 106 and shorter than the low pressure side depth of groove 105. Groove relief face 112 is parallel to face 106. Groove relief face 112 is also closer to inner groove side 111 than is face 106. Relief volume for absorbing the elastomer displaced volume when the seal gap is reduced or varied is provided by the increased separation relative to face 106 of groove relief face 112 from the surface against which elastomeric seal 102 will be presqueezed. All groove corners are radiused in order to avoid elastomer tearing or shearing.

Optionally, seal 102 may have elements having high frictional coefficients integrally bonded into the elastomeric matrix of the seal on the comating surface. For example, silica flour may be incorporated onto the comating surface of seal 102. An increase in friction between the comating surfaces may increase the resistance of the seal to creep.

Figure 9:
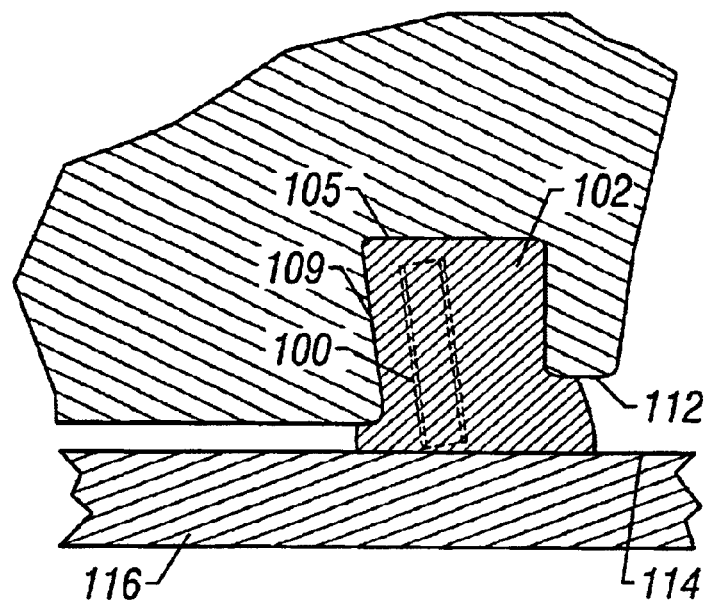
FIG. 9 illustrates the installed seal of FIG. 8 preloaded against its comating seal surface.

FIG. 9 shows the elastomeric seal 102 in groove 105 of FIG. 8 sealing against the adjacent comating surface 114 of body 116. Sufficient presqueeze on elastomeric seal 102 has been provided by bringing comating surface 114 close enough to obtain a suitably high interface pressure between seal 102 and comating surface 114. The elastomer of seal 102 has distorted into the high pressure side relief volume provided between relief face 112 and comating surface 114 due to the presqueeze compression. The presence of antiextrusion strip 100 adjacent low pressure side 109 of groove 105 and firmly embedded in the elastomer of seal 102 which is in turn entrapped in groove 105 ensures that antiextrusion strip is well anchored to resist forces which would tend to displace its end adjacent comating surface 114.

The major advantage of this invention for linear seals accrues primarily from enhancement, by means of providing corrugated construction, of structural strength and stiffness of the antiextrusion strip for resisting pressure loads normal to the midplane of the corrugations. The same advantage applies generally to face seals and other seals of more complex pattern. A linear seal is essentially a segment of a circular face seal of infinite radius. The use of the linear antiextrusion strip is particularly advantageous for large gap situations and high pressures, both of which occur in pipeline repair clamps.

The basic advantages of this invention for annular seals accrue primarily from: a) enhancement, by means of providing corrugated construction, of structural strength and stiffness of the antiextrusion ring for resisting pressure loads normal to or with vector components normal to the midplane of the corrugations, and b) simultaneous reduction of circumferential ring stiffness through provision of the same corrugations so that large diametric changes can be accommodated without either high resistance or overstress and permanent distortion of the ring. The corrugated integrally molded antiextrusion ring can be used with any large gap seal, including the conventional active and passive types.

In all cases, the embedded corrugated antiextrusion device dramatically increases the extrusion resistance of the seal for large gaps without markedly decreasing the desirable conformability of the seal to the comating seal surface. Accordingly, these seals provide low resistance to distortion normal to the comating seal surface in response to both tensioning and pressure biasing. However, the integral corrugated antiextrusion ring can render an otherwise marginal conventional passive or active seal satisfactory for higher pressures. The improved stiffness properties of the annular seal antiextrusion ring for resisting bending and thereby minimizing elastomer extrusion into the seal gap markedly improve the performance of seals for large gaps and high pressures. At the same time, the corrugations appreciably enhance the radial flexibility of the antiextrusion ring by changing its mode of resistance from direct stress (tension or compression) to the much less stiff combined bending and twisting mode of the corrugated disk. Although the flexibility of the integrally molded corrugated antiextrusion insert for motion normal to the comating seal surface is unimportant for linear or near linear seal configurations, the corrugations still provide an enhanced bending stiffness for resisting extrusion for linear or near linear seals.

It is readily understood that the corrugation patterns of this invention, the seal types, and the positioning and number of the antiextrusion members in a seal may be varied to meet different demands. For example, the antiextrusion elements can be adapted readily to both semicircular and circular annular seals, linear or near linear or irregularly shaped seals, stretched or unstretched seals, and both male and female annular seals. The material for the antiextrusion member may likewise be nonmetallic or of composite construction and the positioning of the antiextrusion device(s) may be varied as necessary and practical. The corrugated antiextrusion means described herein offers a practical, easily applied, and economical solution for large gap seals, particularly for high pressure situations.

Having described several embodiments of seals with embedded antiextrusion devices, it is believed that other modifications, variations, and changes will be suggested to those skilled in the art in view of the description set forth above. It is therefore to be understood that all such variations, modifications, and changes are believed to fall within the scope of the invention as defined in the appended claims.

What is claimed is:

1. An annular groove mounted elastomeric seal for sealing a flow passageway, the seal comprising:

an elastomeric material;

a right circular annular rigid corrugated antiextrusion device embedded in and bonded to the elastomeric material; and a plurality of equispaced corrugations radially oriented about the antiextrusion device, the corrugations having a planar midplane, wherein the corrugations enhance the stiffness and bending strength of the antiextrusion device for loads applied normal to the planar midplane of the device while reducing the circumferential strength and stiffness of the antiextrusion device, thereby to provide a resistive force against the extrusion of the elastomeric seal wherein the resistive force is normal to the planar midplane of the antiextrusion device.

2. The elastomeric seal of claim 1, wherein bending of the antiextrusion device produces the resistive force.

3. An antiextrusion device embedded in and bonded to an elastomeric seal, the antiextrusion device comprising:

a right circular annular rigid corrugated material having a plurality of corrugations in an alternating parallel pattern of ridges and grooves displaced from a midplane of the corrugations;

a first cylindrical surface proximal to a mating surface of the elastomeric seal; and a second cylindrical surface distal to the mating surface of the elastomeric seal, wherein restraint of the antiextrusion device by the elastomeric seal in a region adjacent to the second cylindrical surface provides support for the antiextrusion device wherein the antiextrusion device provides a resistive force against extrusion proximal the first cylindrical surface.

* * * * *